(12) United States Patent
Hu et al.

(10) Patent No.: US 8,325,912 B2
(45) Date of Patent: Dec. 4, 2012

(54) HANDHELD DEVICE HAVING LINKAGE SUPPORTER

(75) Inventors: Chih-Kai Hu, Taoyuan County (TW); I-Cheng Chuang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 230 days.

(21) Appl. No.: 12/954,903

(22) Filed: Nov. 28, 2010

(65) Prior Publication Data

US 2011/0298348 A1    Dec. 8, 2011

(30) Foreign Application Priority Data

Jun. 8, 2010    (TW) .............................. 99118560 A

(51) Int. Cl.
*H04M 1/00* (2006.01)
*H04M 9/00* (2006.01)

(52) U.S. Cl. ................ 379/433.12; 455/575.4
(58) Field of Classification Search ............ 379/433.11, 379/433.12; 455/575.4; 361/679.39, 727
See application file for complete search history.

(56) References Cited

U.S. PATENT DOCUMENTS
2007/0259702 A1    11/2007 Kemppinen

FOREIGN PATENT DOCUMENTS
EP    2 254 018 A1    11/2010
GB    2 381 774 A    5/2003

OTHER PUBLICATIONS

Search report issued on Apr. 26, 2011 for EP application No. 11000003.1, filed Jan. 3, 2011, p. 1-4.

*Primary Examiner* — Tuan D Nguyen
(74) *Attorney, Agent, or Firm* — Winston Hsu; Scott Margo

(57) ABSTRACT

A linkage mechanism is configured between two relatively slidable first housing and second housing of a handheld device. The linkage mechanism can be actuated by a first actuator of the first housing when the second housing slides out at an opening status relative to the first housing. The linkage mechanism is actuated to rotate and then to drive a second actuator to slide on the second housing and the second actuator forces a supporter, which pivots to the second housing, to open at a predetermined angle relative to the second housing. The handheld device is made steady on a plane through the support provided by the opened supporter. When the handheld device slides in at a closing status, a restoring spring configured between the supporter and the second housing automatically folds the supporter.

10 Claims, 7 Drawing Sheets

HANDHELD DEVICE HAVING LINKAGE SUPPORTER

BACKGROUND OF THE INVENTION

1. Field of the Invention

The subject application relates to a handheld device, and more particularly, to a handheld device capable of standing on a plane by a supporter when an upper housing slides out relative to a lower housing.

2. Description of the Prior Art

Conventional slide-type handheld devices provide multi-functions and convenient operation. A supporter is disposed behind the casing of the conventional slide handheld devices so as to be unfolded by a user for standing the slide-type handheld devices on the plane at a specific angle. The handheld devices may be operated or whose content may be read easily. However, the supporter of the conventional slide-type handheld devices has to be folded and unfolded manually, which results in inconvenience.

SUMMARY OF THE INVENTION

The subject application provides a handheld device with a supporter for standing on the plane. The handheld device can be selectively configured at an opening status or a closing status. The handheld device includes a first housing, a second housing, a linkage mechanism, and the supporter. The first housing includes a first actuator. The second housing is combined with the first housing in a relatively slidable manner. The linkage mechanism is disposed between the first housing and the second housing. The supporter pivots to the second housing. When the second housing slides relative to the first housing to the opening status, the linkage mechanism driven by the first actuator drives the supporter to pivot relative to the second housing.

These and other objectives of the present invention will no doubt become obvious to those of ordinary skill in the art after reading the following detailed description of the preferred embodiment that is illustrated in the various figures and drawings.

DETAILED DESCRIPTION

The subject application provides a slide-type handheld device having a supporter actuated by a linkage mechanism. As a first housing (an upper housing) slides out at an opening status relative to a second housing (a lower housing), the supporter (kickstand) disposed on the second housing is unfolded to a predetermined angle relative to the second housing so as to have the handheld device stand on a plane stably and to define a predetermined angle relative to a visual angle of a user for convenient operation, such as for watching digital television program, connecting to the Internet, downloading video.

Figure 1:
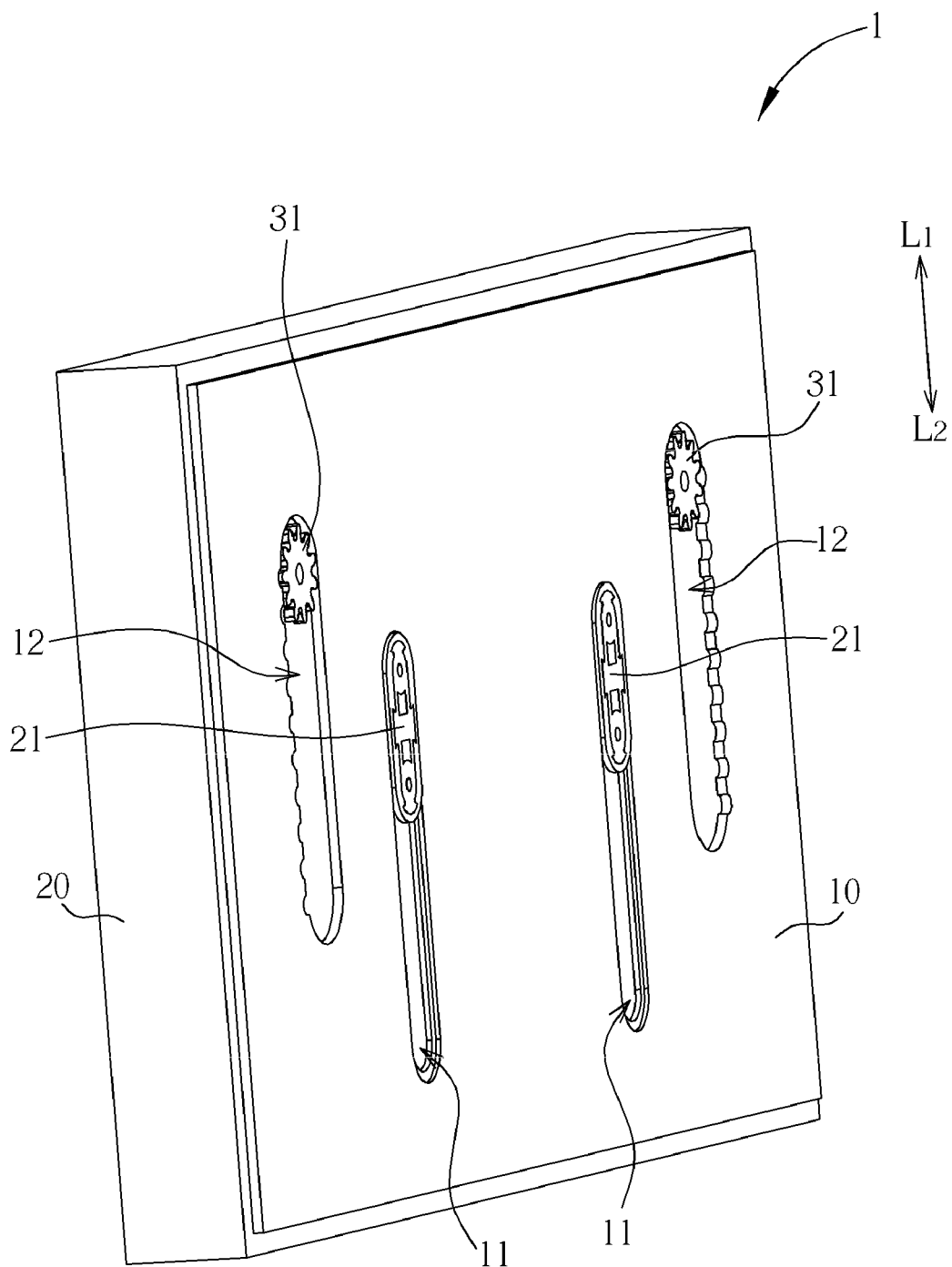
FIG. 1 is a diagram of a handheld device with the supporter at the closing status of the subject application.
Figure 2:
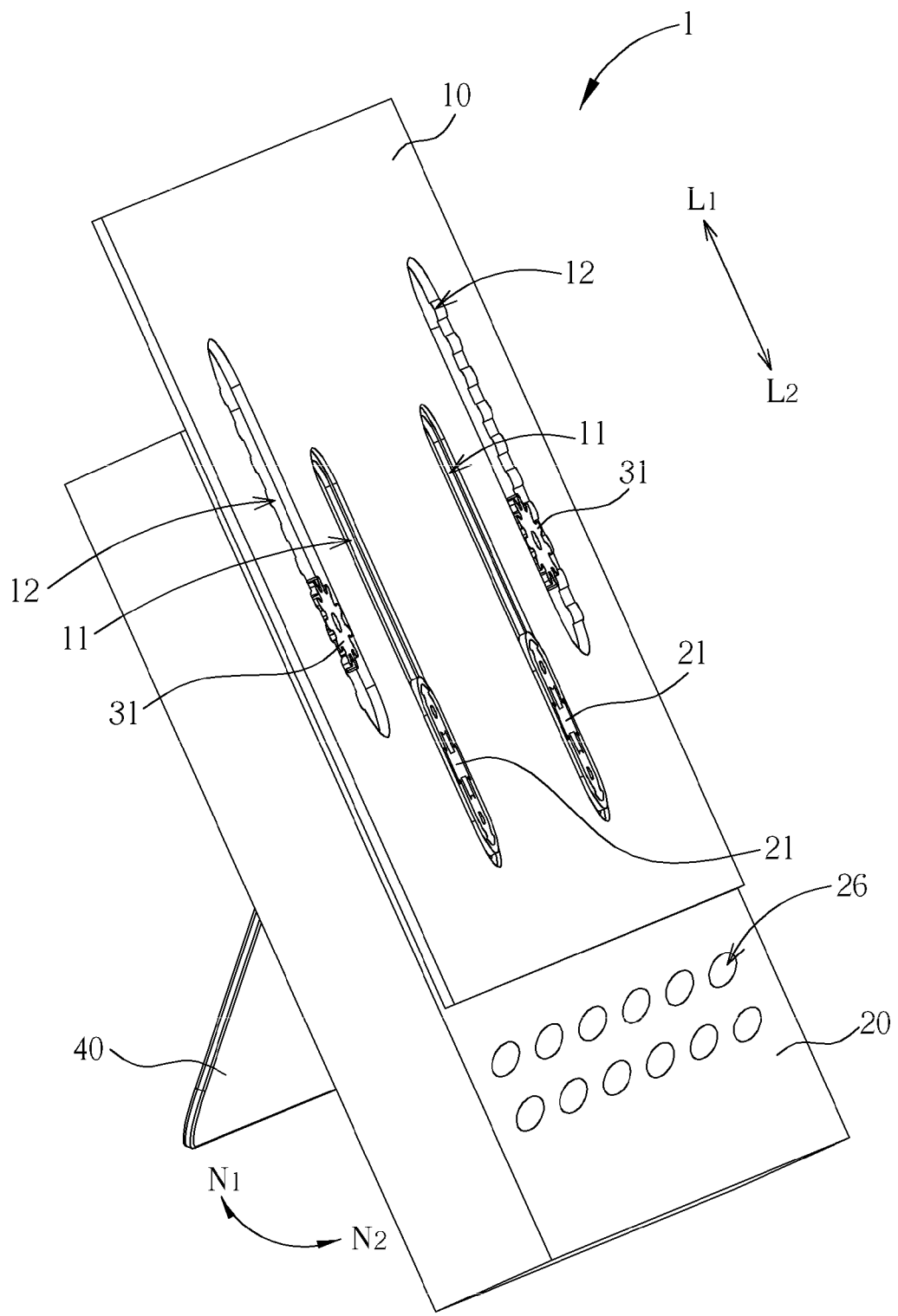
FIG. 2 is a diagram of the handheld device at the opening status of the subject application.

Please refer to FIG. 1 and FIG. 2. FIG. 1 is a diagram of a handheld device 1 at a closing status of the subject application. FIG. 2 is a diagram of the handheld device 1 at an opening status of the subject application. One or more sound holes 26 are formed on the second housing 20. The handheld device 1 is a slide-type portable device, such as a mobile phone, a digital multimedia device, and so on. The handheld device 1 includes a first housing 10 (or upper housing) and a second housing 20 (or lower housing). A display module and other necessary components (such as the buttons, the keypad, the electronic components and circuits, and so on) are disposed on the first housing 10 of the handheld device 1 for convenient operation. When the handheld device 1 at the opening status is put on a plane, the handheld device 1 can provide a preferable view angle and convenient operation. To illustrate the technical structure disclosed by the subject application more clearly, the display module and other necessary components are not drawn in the figures. As shown in FIG. 1 and FIG. 2, the handheld device 1 can be selectively configured at the closing status or at the opening status. The first housing 10 includes one or more first guide rails 11, which can be an extending slot structure in this embodiment. The second housing 20 includes one or more second guide rails 21 corresponding to the first guide rails 11, which can be slidable blocks engaged with the first guide rails 11 in a slidable manner in this embodiment. Since the first guide rails 11 extend along $L_1L_2$ direction and the second guide rails 21 slide inside the first guide rails 11, the second housing 20 is combined with and slidable relative to the first housing 10. For example, the second guide rails 21 can move along $L_2$ direction to the opening status as shown in FIG. 2, or along $L_1$ direction to the closing status as shown in FIG. 1.

When the second housing 20 moves relative to the first housing 10 along the $L_2$ direction to the opening status as shown in FIG. 2, a support 40 of the handheld device 1 driven by a linkage mechanism pivots relative to the second housing 20 along $N_1$ direction to the opening status as shown in FIG. 2, so that the handheld device 1 can stand on the plane stably.

Figure 3:
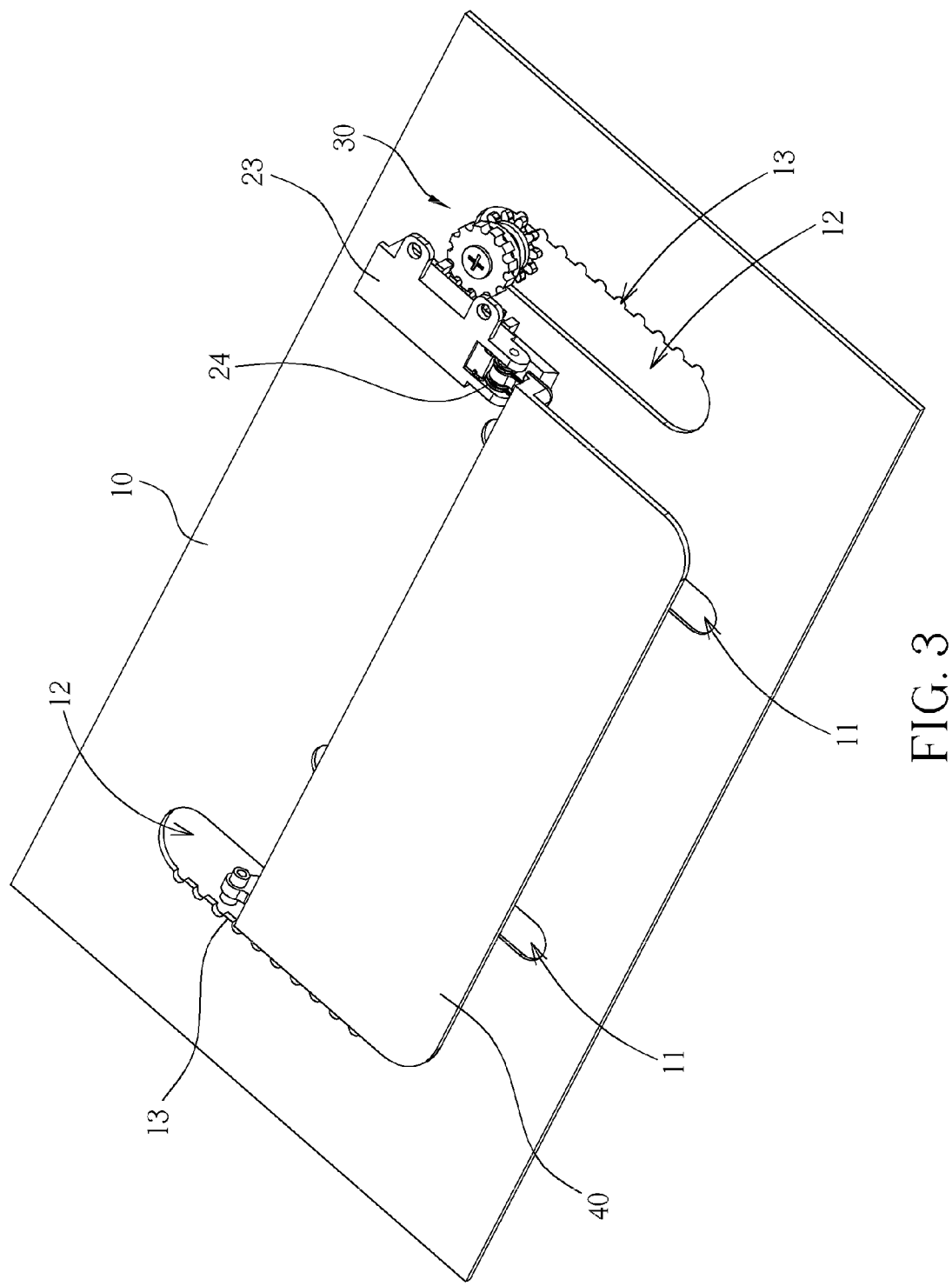
FIG. 3 is a diagram of the linkage mechanism, the first housing, and the supporter of the handheld device of the subject application.
Figure 4:
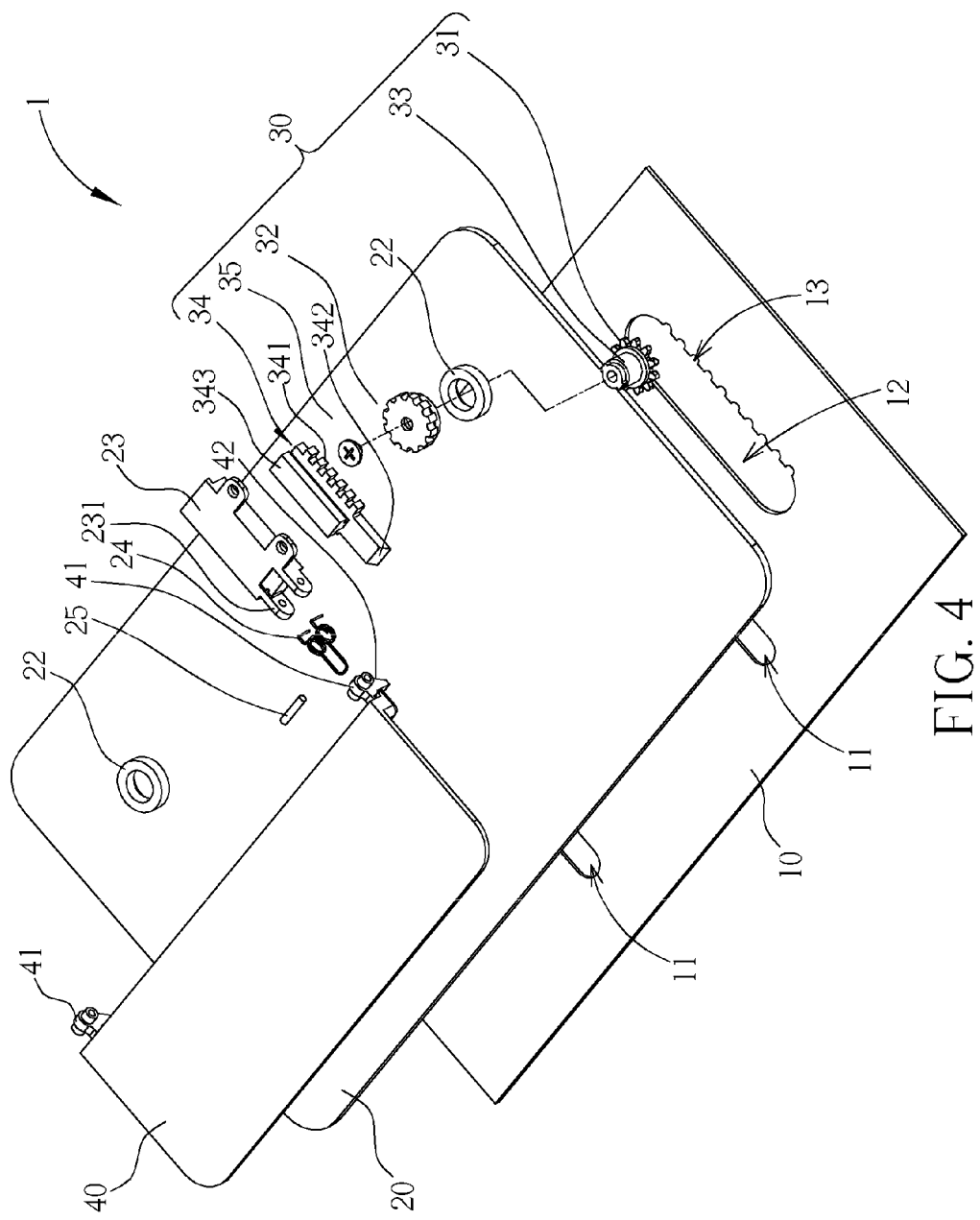
FIG. 4 is an exploded diagram of the components of the handheld device of the subject application.

Please refer to FIG. 3 and FIG. 4. FIG. 3 is a diagram of the linkage mechanism 3, the first housing 10, and the supporter 40 of the subject application (the second housing 20 is not drawn in this figure). FIG. 4 is an exploded diagram of the components of the handheld device 1 of the subject application. The linkage mechanism 30 is disposed between the first housing 10 and the second housing 20, so as to couple the two housings with each other for relative slide mode. Only one linkage mechanism 30 is shown in FIG. 3 and FIG. 4 for simplicity, and the handheld device 1 can practically include two linkage mechanisms 30 disposed on two sides of the handheld device 1 to improve stability of the linkage movement. The first housing 10 includes a first actuator 12 for driving the linkage mechanism 30, and the linkage mechanism 30 drives the supporter 40 to pivot. In this embodiment, the first actuator 12 is a slot extending along the $L_1L_2$ direction, and a rack structure 13 is disposed on a side of the first actuator 12. The linkage mechanism 30 is disposed between the first housing 10 and the second housing 20 and includes a coaxial gear (which is composed of a first gear 31, a second gear 32, and an axle 33), and a second actuator 34. The first gear 31 is engaged with the rack structure 13 of the first actuator 12, the axle 33 passes through a hole 22 of the second housing 20, and the second gear 32 connects to the other side of the axle 33 and is fixed on the axle 33 by a screw 35. The second actuator 34 further includes a rack structure 341 extending along the $L_1L_2$ direction, and the second gear 32 is engaged with the rack structure 341. The second actuator 34 is installed inside a fixing frame 23 of the second housing 20, and a fourth guide rails 343 of the second actuator 34 is matched with a third guide rails 233 of the fixing frame 23 (please refer to FIG. 5 and FIG. 6), so that the second actuator 34 can move inside the fixing frame 23 along the $L_1L_2$ direction. The supporter 40 pivots to the fixing frame 23 of the second housing 20. Two pivoting portions 41 disposed on two sides of the supporter 40 pivot to corresponding pivoting portions 231 disposed on two sides of the fixing frame 23 respectively (via a pin 25), so that the supporter 40 can pivot relative to the fixing frame 23 (and also the second housing 20). A resilient component 24 is disposed between the pivoting portion 41 of the supporter 40 and the pivoting portion 231 of the fixing frame 23 (please refer to FIG. 7 for assembling status). The resilient component 24 can be a restoring spring. When the supporter 40 pivots relative to the fixing frame 23, the resilient component 24 is deformed for generating a resilient restoring force.

Figure 5:
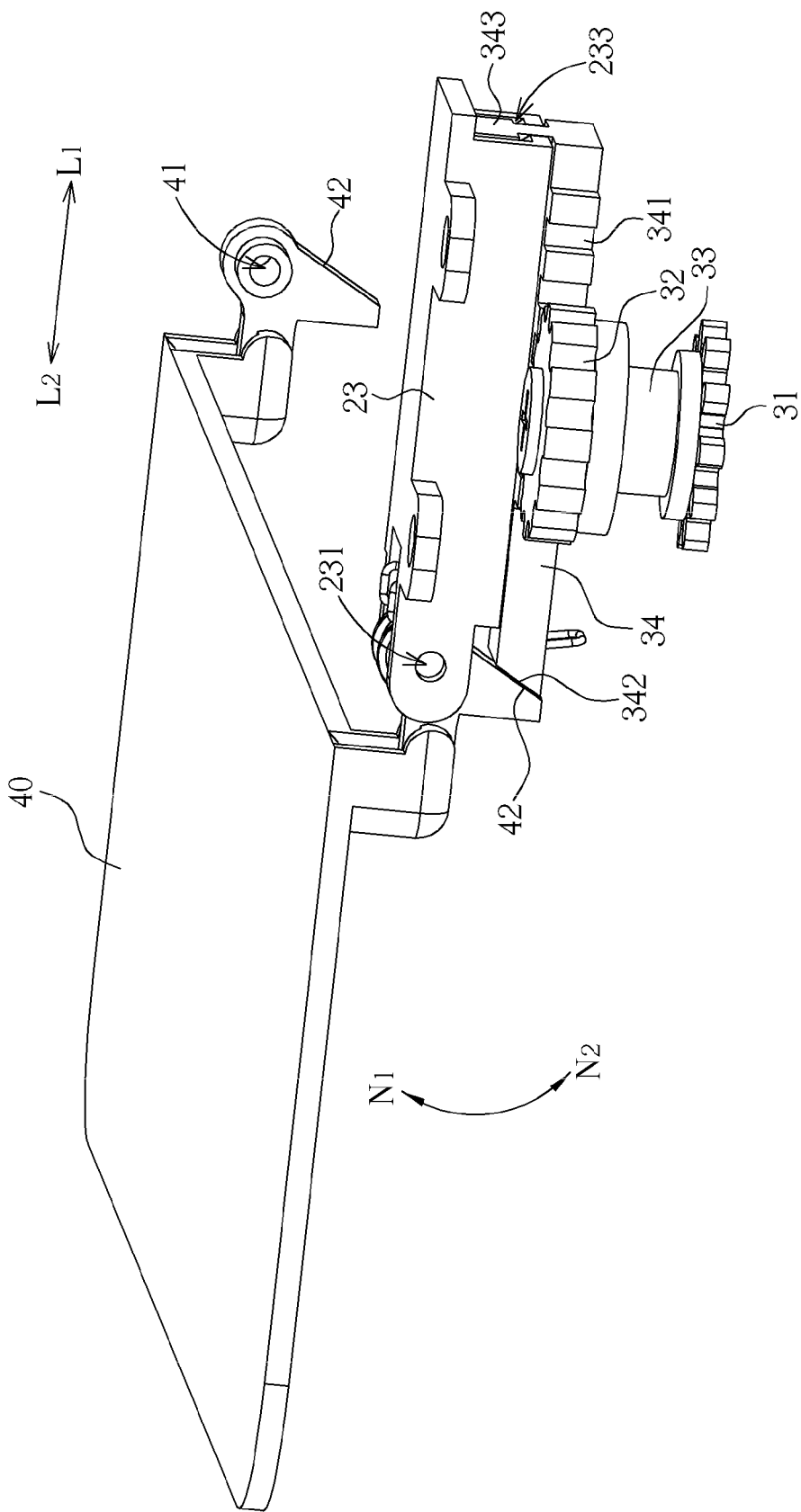
FIG. 5 is a diagram of the supporter folding to move close to the second housing as the handheld device is at the closing status of the subject application.
Figure 6:
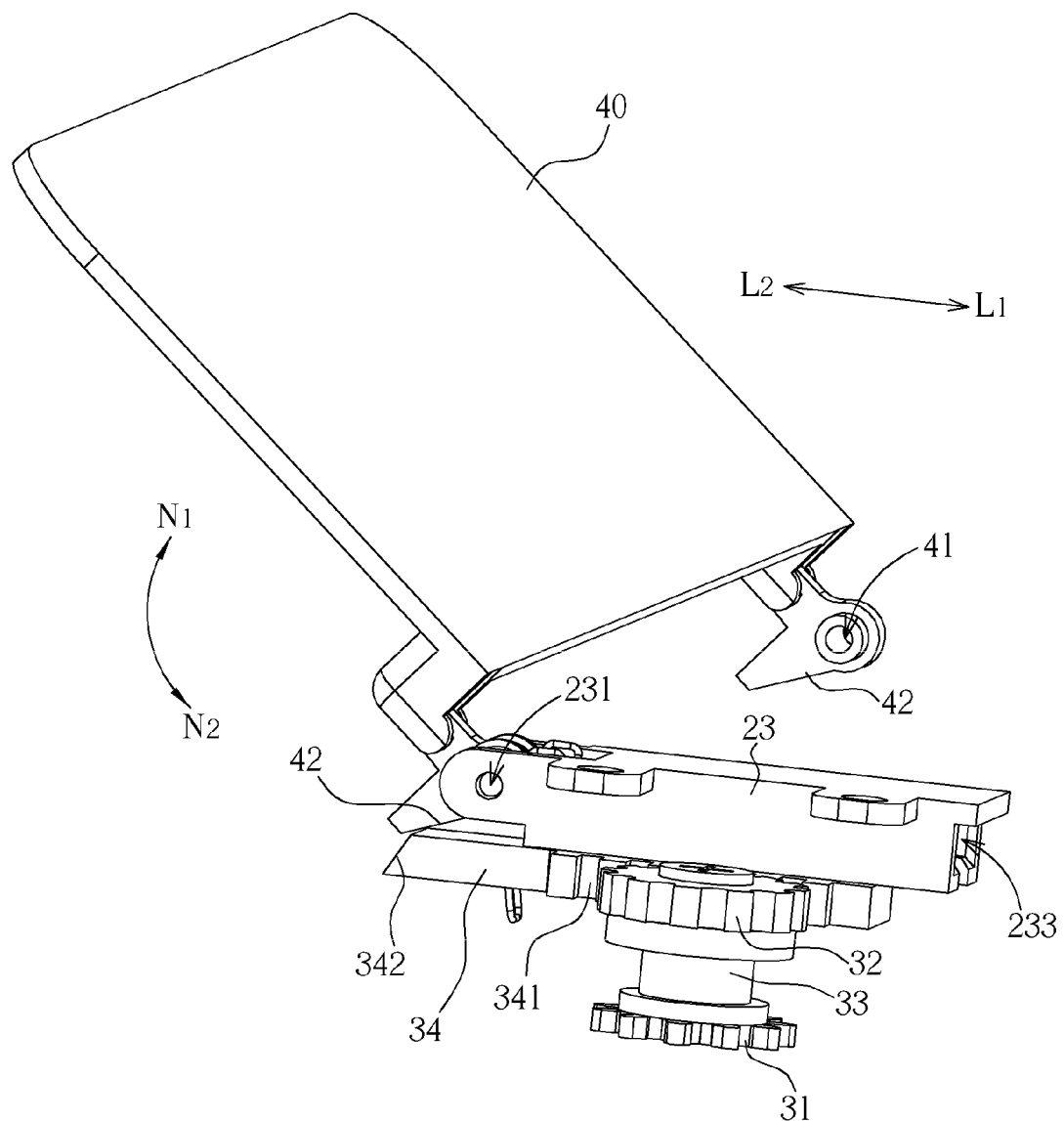
FIG. 6 is a diagram of the supporter pivoting relative to the second housing to a predetermined angle as the handheld device is at the opening status of the subject application.
Figure 7:
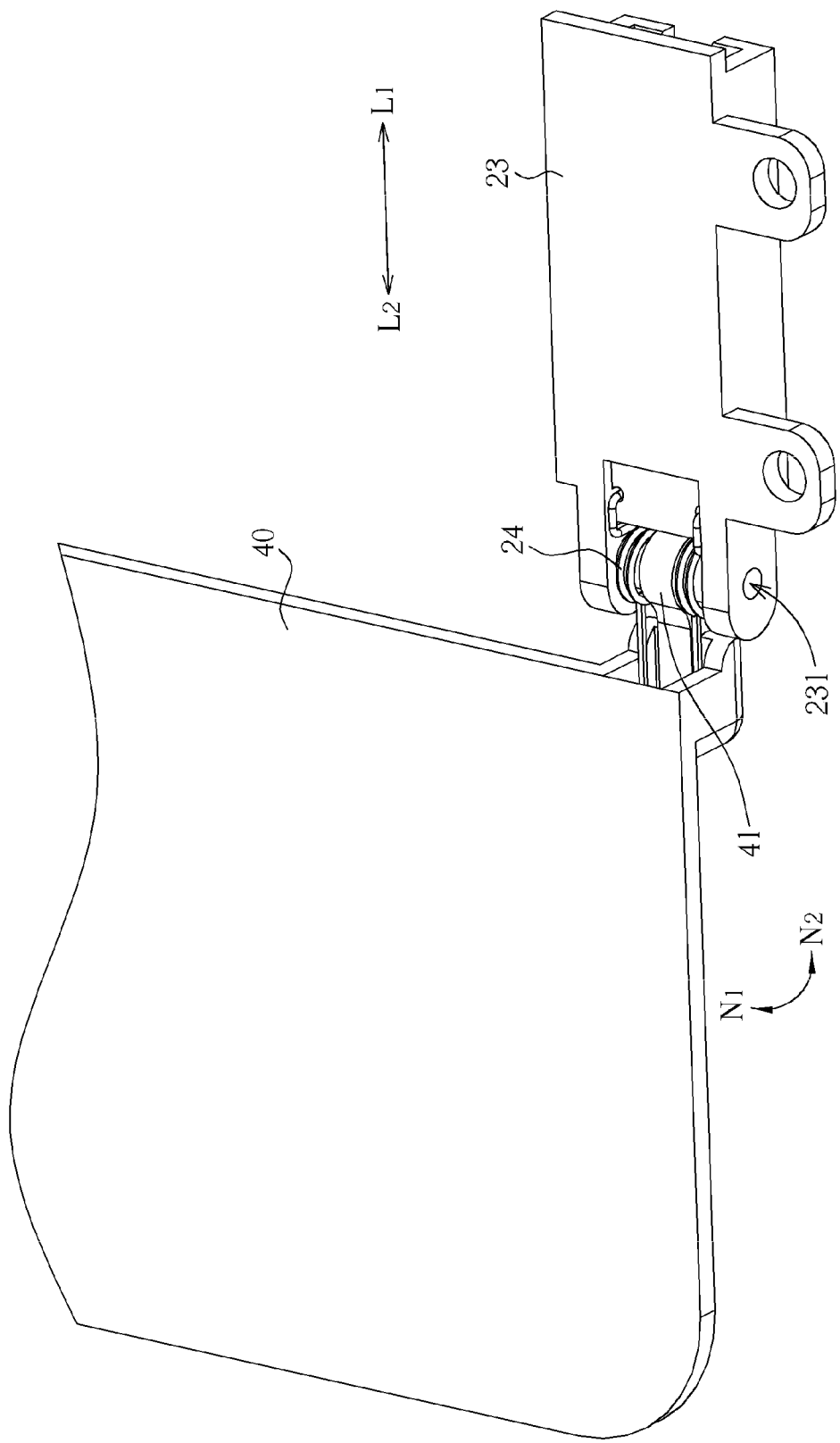
FIG. 7 is a diagram of the supporter pivoting to the fixing frame of the subject application.

Detailed description of the opening process and the closing process of the handheld device 1 of the subject application is illustrated as follows. Please refer to FIG. 5 and FIG. 6. FIG. 5 is a diagram of each component of the linkage mechanism 30 assembled with the fixing frame 23 and the supporter 40 of the second housing 20 of the subject application. Additionally, FIG. 5 also shows that the handheld device 1 is at the closing status that the supporter 40 is folded to approach the second housing 20. FIG. 6 is a diagram of the handheld device 1 at the opening status of the subject application after the supporter 40 pivots relative to the second housing 20 to a predetermined angle. The first housing 10 and the second housing 20 are not drawn in FIG. 5 and FIG. 6 for clearly demonstrating the movement of the linkage mechanism 30 and the supporter 40. As mentioned above, when the handheld device 1 is at the closing status (please refer to FIG. 1), the linkage mechanism 30 and the supporter 40 are positioned as the status in FIG. 5. At this status, a second inclined surface 342 of the second actuator 34 is used to push a first inclined surface 42, which is adjacent to the pivoting portion 41, of the supporter 40.

When the handheld device 1 is within the open-sliding process, the second housing 20 slides relative to the first housing 10 along the $L_2$ direction, the linear rack structure 13 of the first actuator 12 of the first housing 10 driving the first gear 31 to rotate so as to drive the axle 33 and the second gear 32 to rotate at the same direction with the first gear 31. Rotation of the second gear 32 drives the rack structure 341 (which is engaged with the second gear 32) to move along the $L_2$ direction (which means the second actuator 34 moves inside the fixing frame 23 along the $L_2$ direction). At this time, because the second inclined surface 342 of the second actuator 34 is adjacent to the first inclined surface 42 of the supporter 40, the second inclined surface 342 abuts against the first inclined surface 42 and pushes the supporter 40 to pivot relative to the second housing 20 along the $N_1$ direction to the position as shown in FIG. 2 and FIG. 6. The supporter 40 can be driven by the linkage mechanism 30 to unfold automatically as the handheld device 1 slides to the opening status. The handheld device 1 can be positioned on the plane stably. As shown in FIG. 6, the resilient component 24 is deformed by the supporter 40 and generates the restoring force that can be used to drive the supporter 40 to pivot relative to the second housing 20 along the $N_2$ direction.

As the handheld device 1 folds from the opening status as shown in FIG. 2 to the closing status as shown in FIG. 1, the second housing 20 slides relative to the first housing 10 along the $L_1$ direction. At this time, the coaxial gear is driven to rotate by the rack structure 13 of the first actuator 12, and the rotation of the second gear 32 drives the second actuator 34 to move inside the fixing frame 23 along the $L_1$ direction so that the second inclined surface 342 no longer abuts against the first inclined surface 42. Due to the restoring force of the resilient component 24, the supporter 40 pivots relative to the second housing 20 along the $N_2$ direction by the resilient component 24 all the way back to the status as shown in FIG. 5. Thus, the supporter 40 can be folded and unfolded automatically.

The handheld device according to the embodiment of the subject application utilizes the linkage mechanism disposed between the first housing and the second housing. When the second housing slides out at the opening status relative to the first housing, the linkage mechanism driven by the first actuator of the first housing drives the second actuator to slide relative to the second housing. After that, when the second actuator slides relative to the second housing, the second actuator can push the supporter pivoting to the second housing so as to form a predetermined angle between the supporter and the second housing. Therefore, the handheld device at the opening status can be put on the plane stably via the supporter for convenient operation. When the user closes the handheld device, the supporter can be folded by the restoring spring disposed between the supporter and the second housing automatically.

Those skilled in the art will readily observe that numerous modifications and alterations of the device and method may be made while retaining the teachings of the invention.

What is claimed is:

1. A handheld device comprising:
  a first housing comprising a first actuator;
  a second housing slidably disposed on the first housing;
  a supporter pivoted to the second housing, comprising a first inclined surface adjacent to a pivot end that pivots to the second housing; and
  a linkage mechanism disposed between the first housing and the second housing;
  the linkage mechanism being actuated by the first actuator and then driving the supporter to pivot relative to the second housing when the second housing slides out at an opening status relative to the first housing, the linkage mechanism comprising a second actuator for being driven to move along a first direction, the second actuator comprising a second inclined surface for abutting against the first inclined surface to pivot the supporter when the second actuator moves along the first direction.

2. The handheld device of claim 1, wherein the first housing comprises a first guide rail, the second housing comprises a second guide rail, and the first guide rail slidably engages with the second guide rail so that the first housing slides relative to the second housing.

3. The handheld device of claim 1, wherein the linkage mechanism comprises:
  a coaxial gear comprising a first gear and a second gear, an axle of the coaxial gear passing through the second housing, the first gear being engaged with and then driven by the first actuator; wherein
  the second actuator is engaged with the second gear so as to be driven by the coaxial gear for moving along the first direction.

4. The handheld device of claim 3, wherein the first actuator is a slot comprising a rack structure extending along the first direction, and the rack structure is engaged with the first gear.

5. The handheld device of claim 3, wherein the second actuator comprises a rack structure extending along the first direction for engaging with the second gear.

6. The handheld device of claim 3, wherein the second housing further comprises a fixing frame, the second actuator moves inside the fixing frame along the first direction, and the supporter pivots to the fixing frame.

7. The handheld device of claim 6, wherein the fixing frame comprises a third guide rail, and the second actuator comprises a fourth guide rail for moving inside the third guide rail so that the second actuator moves inside the fixing frame along the first direction.

8. The handheld device of claim 1 further comprising:
a resilient component disposed at the pivot end between the supporter and the second housing, the supporter being driven by the linkage mechanism and the resilient component providing a resilient restoring force to the supporter when the second housing slides out at the opening status relative to the first housing, and the second actuator moving along a second direction and the resilient component driving the supporter to pivot when the second housing slides in at a closing status relative to the first housing.

9. The handheld device of claim 8, wherein the resilient component is a restoring spring.

10. The handheld device of claim 1, wherein the handheld device is a slide mobile device.

* * * * *